Patented Oct. 25, 1927.

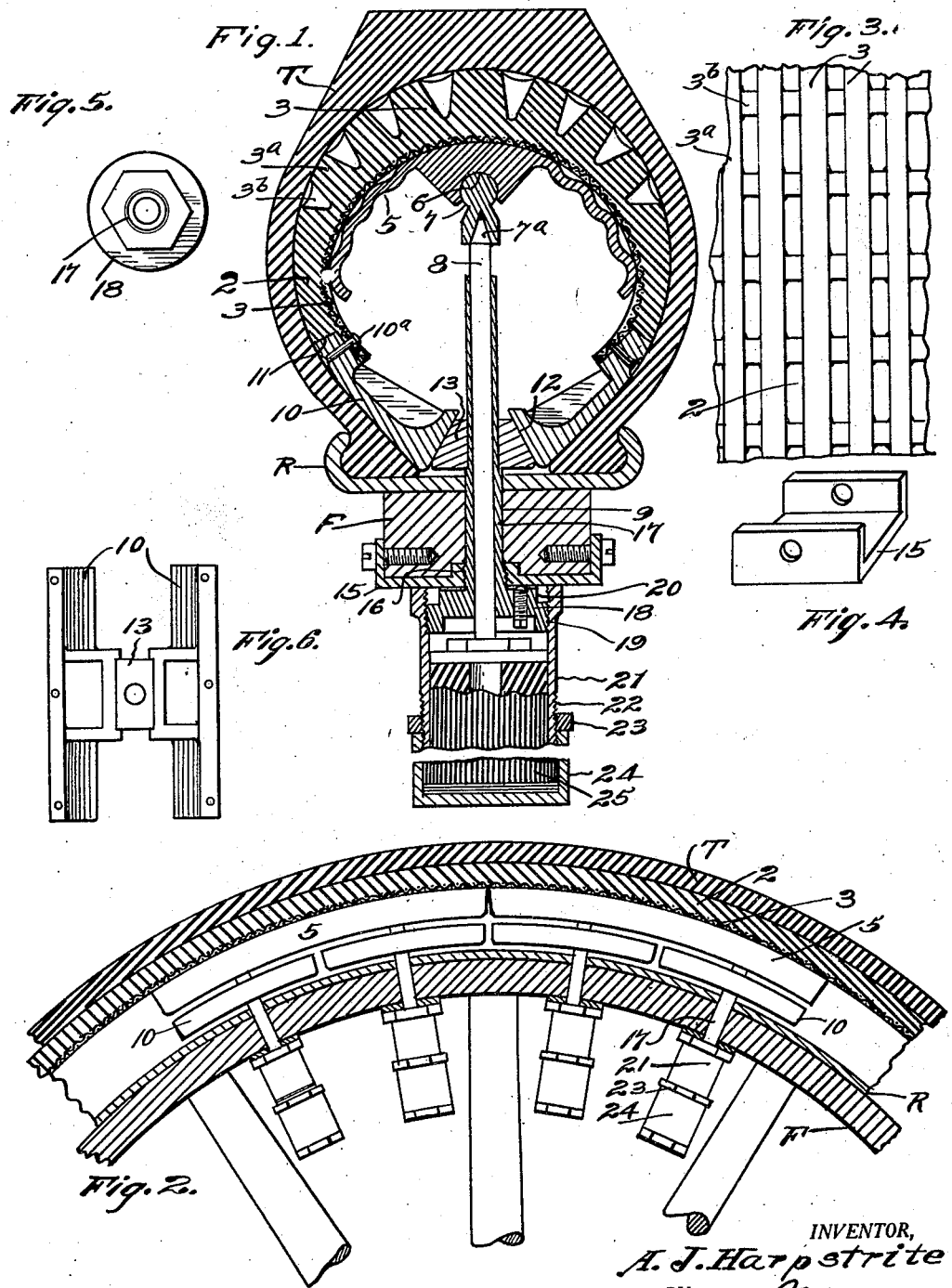

1,646,480

UNITED STATES PATENT OFFICE.

AUGUSTUS J. HARPSTRITE, OF LOS ANGELES, CALIFORNIA.

TIRE FILLER.

Application filed June 22, 1926. Serial No. 117,754.

This invention relates to cushion apparatus for vehicle wheels.

It is very desirable to provide a substitute for pneumatic tubes for sustaining rubber tires and such is the general purpose of the present invention.

A further object is to provide for the desired resiliency and wholly eliminate the troubles incident to the use of air tubes. Another object is to avoid the use of any form of metallic spring. Another is to provide a primary cushion medium and a firmer secondary cushion means.

Additional objects are to provide a cushion means bodily insertible into the standard or conventional tire carcass without change thereof and in this connection to provide cushion apparatus readily combinable with standard tires and wheel structures with but small cost of adaptation and without materially mutilating the same. A still further purpose is to provide for the ready variation of the degree of resiliency of the cushion means without the removal of any part of the apparatus or of the wheel equipment.

Other objects and advantages will be made apparent in the ensuing specification of an embodiment of the invention illustrated herewith; it being reserved that modifications, variations and adaptations may be resorted to within the principle, scope and spirit of the invention as it is here claimed.

Figure 1 is a cross-section of a tire, wheel rim and the cushion apparatus.

Figure 2 is a central, longitudinal section of a part of the wheel, tire and its cushion means.

Figure 3 is a plan of a portion of the primary cushion pad.

Figure 4 is a perspective of a rim clip.

Figure 5 is a plan of a pad backer jack.

Figure 6 is a plan of a set of clincher plates.

The invention is shown as adapted to a wheel including a felly F having a clincher rim R receiving a tire carcass T of conventional type. The usual inflatable tube of such tires is wholly eliminated and in its place a continuous, circular pad is introduced.

The pad 2 includes a heavy fabric base $2^a$, semicircular in cross-section, on which is well vulcanized a crescent-section of rubber in peripheral beads 3—$3^a$; the former or intermediate beads being soft and the outer beads being much firmer. At suitable intervals the beads are cross-bonded at $3^b$.

After the pad 2 is worked into place in the tire T (before this is placed on the rim) means are introduced to thrust the pad outward. This means includes a series of stout metal segments 5, of arc-section, matching the hollow of the circular pad 2. Each backing segment 5 has one or more ball sockets 6 for ball-joints 7 of removable jack stems 8 which, after the assembly of the tire on the wheel felly, are passed through holes 9 in the felly and rim R. Each ball-joint 7 is attached to its backer 5 and has a conical seat $7^a$ for the easy entrance of the pointed jack stem 8, as will be later set forth.

After the pad 2 and the backers 5 have been laid in the dismounted carcass T means are introduced to stay the side walls of the pad 2 and also to lock or clinch them along the contiguous inside of the flanges of the rim R, when this type of rim is used on the wheel.

The locking means includes pairs of opposite lock plates 10 having shoulders 11 thrusting against the near edges of the walls of the pad 2 and being longitudinally curved to match them, as seen in Fig. 2. The lock plates 10 have inclined inner faces which abut wedges 13 through which the jack stems 8 extend radially of the wheel.

When the lock means has been placed in the carcass this is slipped onto the rim.

At suitable intervals along the felly are secured clips 15 having threaded holes 16 registering with the holes 9.

In order to set the wedge parts a series of hollow screws 17 are provided, each screw having a large head 18 threaded externally at 19. The screws are run into holes 9—16 and engage the inner ends of wedges 13 and as these are pressed outward they engage the faces 12 of the side plates 10, which are so located as to force the carcass walls out against the rim flanges. The head 19 has wrench faces 20 for a suitable tool.

The secondary cushion includes a series of barrels 21 screwed on the heads 18. Each barrel has exterior threads 22 receiving a jam nut 23 setting against a cup 24 which encloses a block of firm rubber 25. This rubber block constitutes a variable cushion supporting the near end of the relative jack stem 8; such stems being passed into the hollow screws 19 before the cups 24 are applied.

To facilitate assembly the ball-joints 7 are brought to the top of the wheel and then hang pendent so that the stem points are easily registered in the seats 7ª. This done the cups 24 are screwed on and the cushions 25 compressed to a desired degree to yieldably support the jack stems 8.

The lock nuts 23 are set up to hold the cups as set.

Ordinary road shocks are absorbed by the cushion beads 3—3ª and the harder jolts are taken by the jack stems and the secondary cushions 25.

Side strains on the stems are taken by the extended screws 17.

Thus I provide a non-blowout cushion for rubber tires.

The clincher plates 10 are shown as attached by rivets 10ª to the pad fabric 3, thus forming a unit for insertion into the tire.

The jack segments 5 are shown as corrugated to obtain strength longitudinally without weight.

What is claimed is:

1. The combination in a vehicle wheel, of a felly and a rim and tire carcass thereon, a ring pad lining the carcass, segmental backers lining the pad, means independent of the backers to support the walls of the pad, guide tubes fixedly extending through the rim, jack stems sliding in the guides and bearing against the backers, barrels mounted adjacent the inner face of the felly, and non-metallic cushion bodies supporting the stems and being wholly enclosed in the barrels.

2. The combination, in a vehicle wheel, of a felly carrying a carcass, a continuous pad lining the carcass, a series of close backers for the pad, guide tubes mounted in the felly and extending out toward the backers, barrels having outer sections attached to the bases of the tubes and having adjustable inner sections, non-metallic cushion bodies wholly enclosed in the barrels, and jack stems slidably supported in the tubes and being thrust outward by the said bodies to support the backers.

3. The combination, in a vehicle wheel, of a felly and a carcass thereon, and means to distend the carcass, said means including a set of clips attachable to the inner face of the felly, radially extending guide tubes mounted on the clips and having threaded inner ends, sectional barrels attached to said ends and enclosing non-metallic cushions, and jack stems bearing on the cushions and being slidably supported in the tubes, and carrying respective carcass supports.

AUGUSTUS J. HARPSTRITE.